No. 783,037. PATENTED FEB. 21, 1905.
N. P. J. HERBY.
ENGINE TRANSMISSION AND REVERSING DEVICE.
APPLICATION FILED DEC. 17, 1903.
2 SHEETS—SHEET 1.
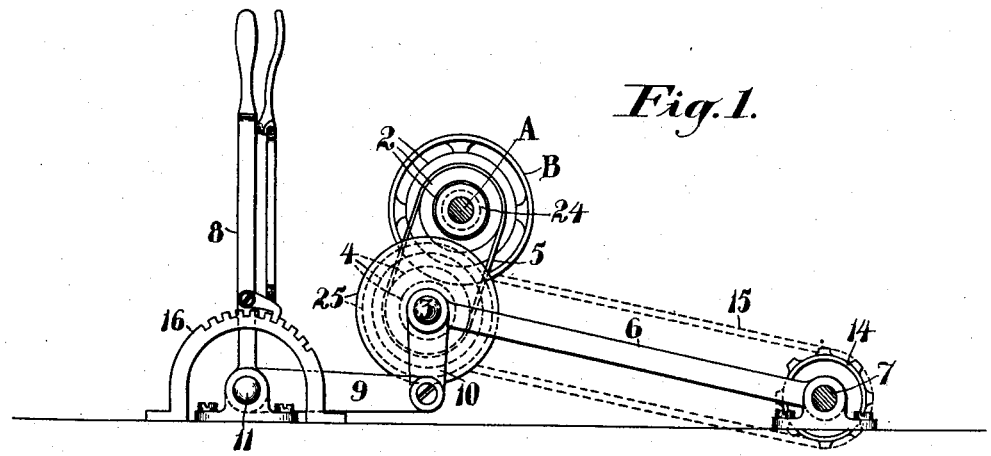
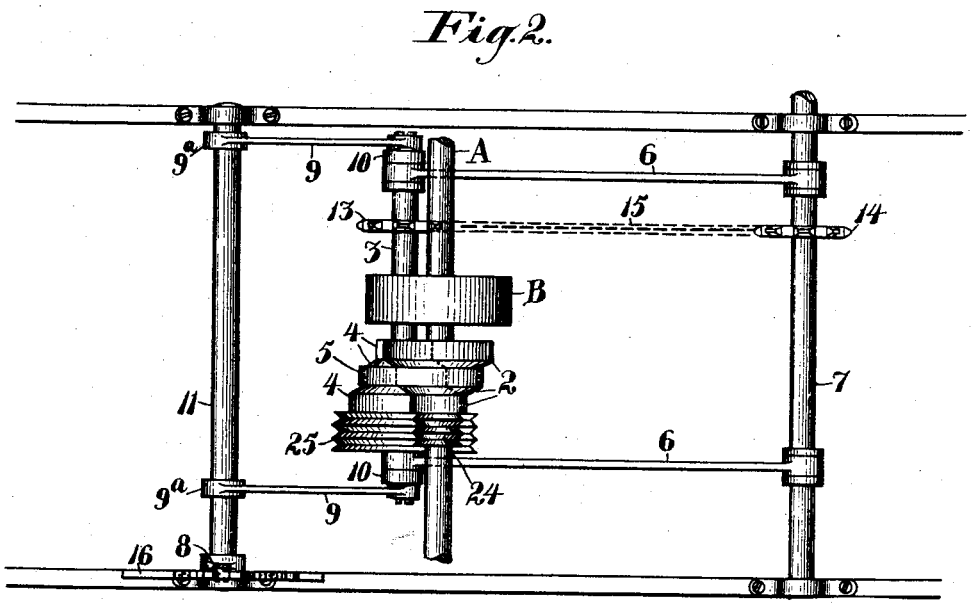

No. 783,037. PATENTED FEB. 21, 1905.
N. P. J. HERBY.
ENGINE TRANSMISSION AND REVERSING DEVICE.
APPLICATION FILED DEC. 17, 1903.

2 SHEETS—SHEET 2.

Witnesses:— Inventor,

No. 783,037. Patented February 21, 1905.

UNITED STATES PATENT OFFICE.

NELS P. J. HERBY, OF OAKLAND, CALIFORNIA, ASSIGNOR TO GRETCHEN HERBY, OF OAKLAND, CALIFORNIA.

ENGINE TRANSMISSION AND REVERSING DEVICE.

SPECIFICATION forming part of Letters Patent No. 783,037, dated February 21, 1905.

Application filed December 17, 1903. Serial No. 185,474.

*To all whom it may concern:*

Be it known that I, NELS P. J. HERBY, a citizen of the United States, residing at Oakland, in the county of Alameda and State of California, have invented new and useful Improvements in Engine Transmission and Reversing Devices, of which the following is a specification.

My invention relates to an apparatus for the convenient and easy transmission of power from a motor, means for varying the speed of the transmission, and means by which the motion may be reversed without the interposition of a number of gears or equivalent transmitting mechanism.

My invention consists of the parts and the constructions and combinations of parts hereinafter more fully described, having reference to the accompanying drawings, in which—

Figure 3:
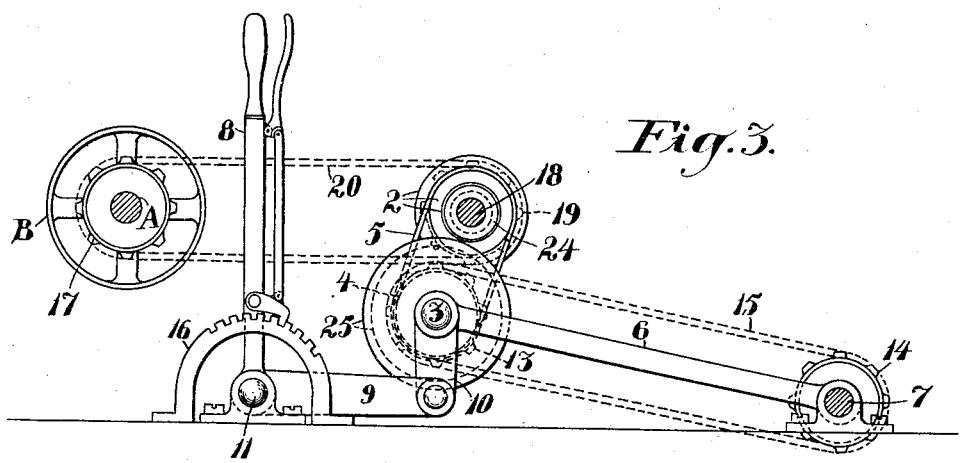
Figure 4:
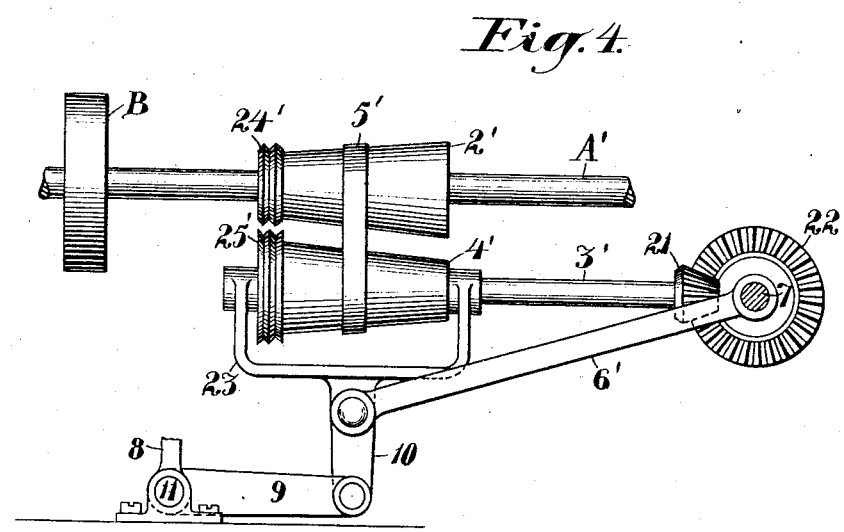

Figure 1 is a side elevation showing the application of my invention. Fig. 2 is a plan view of the same. Fig. 3 shows its application to vehicle propulsion, partially by belt and partially by chain transmission. Fig. 4 is a modification showing combined belt and gear transmission.

In the usual methods of transmitting power, such as are employed for automobiles and for like or similar purposes, it is common to use various forms of chain or gear transmission of speed varying and reversing devices.

It is the object of my invention to provide for the reversing device and for changes of speed without the use of a multiplicity of expensive gears, with resultant loss of power by friction.

In carrying out my invention I may apply it directly by means of belt-pulleys and the necessary shifting mechanism, or it may be employed in conjunction with other chain or gear transmission.

As shown in Fig. 1, A is the main crank-shaft carrying upon it the fly-wheel, as at B, and cone-pulleys, as at 2. These pulleys may either be made tapering from one end to the other or may be made with offsets between each of the sizes, and the smaller end of one cone coincides with the larger end of the other cone, which cone is shown at 4, mounted upon a counter-shaft 3. Around the pulleys 2 and 4 passes a belt, as at 5, and by shifting this belt to one end or the other of the cone the speed may be varied to any desired degree within the limits of the construction. If the cones 2 are made with offsets between the various sizes, it is preferable to make these offsets slightly inclined or in the form of flat cones, so that the belt may be easily moved from one to the other. This movement of the belt from one size of cone to another may be effected by any suitable or well-known form of belt-shifting device, operated by a lever or otherwise. If no change of speed is required in the apparatus and only a reversing motion, it will be manifest that single plain pulleys will be sufficient.

The counter-shaft 3 has its ends journaled in suitable boxes in the ends of radius-rods 6. The opposite ends of these rods are turnable about fixed centers 7, so that by moving the shaft 3, with its pulleys, it may be moved around the center 7, and in one direction moved away from the pulleys 2 until the belt 5 is tightened sufficiently upon the pulleys to transmit motion from the motor-shaft to the counter-shaft 3. If moved in the opposite direction so that the belt is sufficiently slack, the belt will hang upon one of the pulleys and the other will turn freely within the belt and no motion will be transmitted. If it be desired to reverse the apparatus, it is only necessary to move the counter-shaft 3 until the pulleys or frictional surfaces carried by this counter-shaft will contact with similar frictional surfaces upon the motor-shaft, when it will be manifest that the motion of the counter-shaft will be reversed.

In the present case I have shown the end of the radius-rods which carry the counter-shaft or the shaft itself connected by links 10 with the arms 9 of a bell-crank lever, which is fulcrumed, as shown at 9ª, and the longer arm of the lever 8 may be provided with any suitable pawl mechanism adapted to engage with the teeth of a segmental rack, as at 16, so that by the movement of this lever about its fulcrum 11 and through the links 10 the radius-rods and the pulleys carried by the counter-shaft 3 will be moved as previously described. These radius-rods serve to properly control the movements of the counter-shaft with relation to the shaft from which the power is received.

Motion may be transmitted from the counter-shaft to any other shaft parallel therewith, as represented at 7, by means of sprockets 13 and 14 and an intermediate chain, as at 15. As the counter-shaft is movable about the shaft 7, it will be manifest that a proper tension will be maintained upon the chain 15 at all times whether the counter-shaft is driven in a forward direction, reverse, or remaining stationary.

In Fig. 3 I have shown a sprocket-wheel 17 mounted upon the motor-shaft and a journaled shaft 18, having a sprocket-wheel 19, corresponding with 17, about which a chain 20 passes and by which motion is first transmitted from the motor to this intermediate shaft 18, the shaft 18 in this case carrying the pulleys 2. The counter-shaft 3 is located in proper relation with the shaft 18 and, as before described, carries the pulleys 4, around which the belt 5 passes. It may be operated by the bell-crank levers 8 and 9, as previously described, or by any other suitable or convenient means by which the pulleys 4 may be moved to or from the pulleys 2. In this case, as previously described, motion is transmitted by a chain 15 from the sprocket-wheel 13 upon the counter-shaft to the sprocket-wheel 14 upon the driven shaft 7, which in this case is the wheel-shaft 7 of the vehicle upon which the apparatus is mounted.

In Fig. 4 I have shown the pulleys 2' and 4' in the form of smooth tapering cones. In this construction the belt 5' is movable to any point upon the cones by suitable shifting mechanism (not herein shown) to vary the speed of the counter-shaft relative to the drive-shaft. The engine-shaft A' in this case is mounted longitudinally upon the vehicle, and the counter-shaft 3', which is parallel with the engine-shaft, carries a beveled driving-pinion 21 upon the rear end, this pinion engaging the corresponding beveled gear-wheel 22, which is mounted upon the rear axle in conjunction with a differential gear, such as is ordinarily employed upon such vehicles. The radius-rods 6' in this case may connect with the yoke or carrier 23, in which the shaft 3' is journaled, and as the radius-rods are movable about the rear axle, as previously described, it will be manifest that the gears will be maintained in proper mesh whatever may be the relative position and movements of the shaft 3'. Any suitable lever connection may be made to operate the counter-shaft as previously described.

The character of the frictional surface which is designed to transmit motion when the movement is to be reversed may be varied to suit conditions. In the present case in Fig. 2 I have illustrated such a device by corrugated pulleys 24 and 25, the corrugations on the peripheral surfaces of which are adapted to engage each other with such frictional contact as will prevent any material slippage when they are brought together. It will be understood that the reversing movement of the engine when applied to a vehicle will necessarily be slower than the highest forward speed. For this reason I have shown the reversing friction-pulley 24 as being made much smaller than the pulley 25, to which the power is applied. The frictional surfaces 24 25 24' 25' are preferably made integral with their respective pulleys 2 4 2' 4', as herein shown.

Having thus described my invention, what I claim, and desire to secure by Letters Patent, is—

1. In a device of the character described, the combination of a drive-shaft and a driven shaft having relatively fixed bearings, an intermediate shaft having movable bearings, a support including a bell-crank lever for said movable bearings and means for locking said lever at desired points, means for supporting said intermediate shaft at a uniform distance from the driven shaft, pulleys on the drive and intermediate shafts, a band connection between the pulleys and means for transmitting motion from the intermediate shaft to the driven shaft.

2. In a device of the character described, the combination of a drive-shaft, a counter-shaft, and a driven shaft, oppositely-arranged cone-pulleys on the drive and counter shafts, a belt passing over said pulleys and shiftable longitudinally thereof, a grooved annular friction-pulley on the smaller end of the pulley on the drive-shaft, a corresponding grooved engaging pulley on the larger end of the pulley on the counter-shaft, means for maintaining the counter-shaft at a uniform distance from the driven shaft, means for moving the counter-shaft relative to the drive-shaft to tighten the belt or to cause said frictional pulleys to engage, and means for transmitting motion from the counter-shaft to the driven shaft.

3. In a device of the character described, the combination of a drive-shaft, a counter-shaft and a driven shaft, oppositely-arranged cone-pulleys on the drive and counter shafts, a belt passing over said pulleys and shiftable longitudinally thereof, a grooved annular friction-pulley on the smaller end of the pulley on the drive-shaft, a corresponding grooved engaging pulley on the larger end of the pulley on the counter-shaft, means for maintaining the counter-shaft at a uniform distance from the driven shaft, means for moving the counter-shaft relative to the drive-shaft to tighten the belt or to cause said frictional pulleys to engage, and means for transmitting motion from the counter-shaft to the driven shaft, said counter-shaft-moving means including a bell-crank lever supporting the bearings of the counter-shaft, and means to lock said lever to hold said counter-shaft in any desired position relative to the drive-shaft.

4. In a device of the character described, the combination of a drive-shaft, a counter-shaft and a driven shaft, transmission connections between the drive-shaft and counter-shaft and between the latter and the driven shaft, means for causing the counter-shaft to approach or recede from the drive-shaft, said means including a bell-crank lever and a link pivoted to said lever, said link having a forked end in which the counter-shaft is journaled.

In testimony whereof I have hereunto set my hand in presence of two subscribing witnesses.

NELS P. J. HERBY.

Witnesses:
  MATHIAS PETERSEN,
  L. D. ROYCE.